United States Patent
Richardson et al.

(10) Patent No.: US 10,427,346 B2
(45) Date of Patent: Oct. 1, 2019

(54) EXTRUDED REINFORCEMENTS

(71) Applicant: Zephyros, Inc., Romeo, MI (US)

(72) Inventors: Henry E. Richardson, Washington, MI (US); Jeffrey Thomas Shantz, Metamora, MI (US); Alexander Gabriel Mangiapane, Macomb Township, MI (US)

(73) Assignee: Zephyros, Inc., Romeo, MI (US)

( * ) Notice: Subject to any disclaimer, the term of this patent is extended or adjusted under 35 U.S.C. 154(b) by 302 days.

(21) Appl. No.: 15/307,687

(22) PCT Filed: Apr. 30, 2015

(86) PCT No.: PCT/US2015/028580
§ 371 (c)(1),
(2) Date: Oct. 28, 2016

(87) PCT Pub. No.: WO2015/168440
PCT Pub. Date: Nov. 5, 2015

(65) Prior Publication Data
US 2017/0050365 A1 Feb. 23, 2017

Related U.S. Application Data

(60) Provisional application No. 61/986,402, filed on Apr. 30, 2014, provisional application No. 62/061,816, (Continued)

(51) Int. Cl.
*B29C 47/00* (2006.01)
*B29C 48/00* (2019.01)
(Continued)

(52) U.S. Cl.
CPC ...... *B29C 48/0021* (2019.02); *B29C 48/0012* (2019.02); *B29C 48/0022* (2019.02);
(Continued)

(58) Field of Classification Search
CPC .... B29K 2105/0094; B29K 2105/0067; B29K 2077/00; B29K 2309/08; B29K 2509/08;
(Continued)

(56) References Cited

U.S. PATENT DOCUMENTS 3,914,002 A 10/1975 Berliner et al.
4,751,249 A 6/1988 Wycech
(Continued)

FOREIGN PATENT DOCUMENTS

DE 102011015453 A1 4/2012
DE 102013100399 B3 2/2014
(Continued)

OTHER PUBLICATIONS

Copending Application for U.S. Appl. No. 62/154,778, filed Apr. 30, 2015.
(Continued)

*Primary Examiner* — Vishal I Patel
(74) *Attorney, Agent, or Firm* — The Dobrusin Law Firm, PC (57) ABSTRACT

A polymeric insert formed by extruding a material including polyamide and a plurality of long fibers to form a column structure having a first profile. A method for making such an insert comprising passing a polymeric material in a substantially flowable state through a die, and substantially simultaneously passing a fiber through the die, wherein during the passing step the polymeric material has a relative viscosity of less than about 60 according to ASTM D789.

20 Claims, 8 Drawing Sheets

Related U.S. Application Data filed on Oct. 9, 2014, provisional application No. 62/074,237, filed on Nov. 3, 2014.

(51) Int. Cl.

| | | |
|---|---|---|
| *B29C 48/09* | (2019.01) | |
| *B29C 48/12* | (2019.01) | |
| *B29C 65/56* | (2006.01) | |
| *B29C 65/00* | (2006.01) | |
| *B29C 48/11* | (2019.01) | |
| B29K 105/00 | (2006.01) | |
| B29K 105/14 | (2006.01) | |
| B29C 70/52 | (2006.01) | |
| B29K 77/00 | (2006.01) | |
| B29K 309/08 | (2006.01) | |
| B62D 29/00 | (2006.01) | |
| F16B 7/04 | (2006.01) | |
| B29K 105/06 | (2006.01) | |
| B29K 509/08 | (2006.01) | |
| B29L 31/00 | (2006.01) | |

(52) U.S. Cl.
CPC ............ *B29C 48/022* (2019.02); *B29C 48/09* (2019.02); *B29C 48/11* (2019.02); *B29C 48/12* (2019.02); *B29C 65/562* (2013.01); *B29C 66/5227* (2013.01); *B29C 70/52* (2013.01); *B29K 2077/00* (2013.01); *B29K 2105/0067* (2013.01); *B29K 2105/0094* (2013.01); *B29K 2105/06* (2013.01); *B29K 2105/14* (2013.01); *B29K 2309/08* (2013.01); *B29K 2509/08* (2013.01); *B29L 2031/003* (2013.01); *B62D 29/002* (2013.01); *F16B 7/0413* (2013.01)

(58) Field of Classification Search
CPC ............ B29K 2105/06; B29K 2105/14; B29L 2031/003; B29C 70/52; B29C 47/0023; B29C 47/0028; B29C 47/003; B29C 47/0042; B29C 47/0064; B29C 47/0066; B29C 65/562; B29C 47/0004; B29C 66/5227; B62D 29/002; F16B 7/0413

See application file for complete search history.

(56) References Cited

U.S. PATENT DOCUMENTS

| | | | |
|---|---|---|---|
| 4,901,500 A | 2/1990 | Wycech | |
| 5,059,057 A | 10/1991 | Graef | |
| 5,755,486 A | 5/1998 | Wycech | |
| 5,779,961 A * | 7/1998 | Teutsch | B29C 47/003 264/176.1 |
| 6,935,681 B2 | 8/2005 | Hasler et al. | |
| 7,249,415 B2 | 7/2007 | Larsen et al. | |
| 7,673,930 B2 | 3/2010 | Stratman | |
| 7,784,186 B2 | 8/2010 | White et al. | |
| 7,941,925 B2 | 5/2011 | Larsen et al. | |
| 8,020,924 B2 | 9/2011 | Niezur et al. | |
| 8,361,589 B2 | 1/2013 | Kraushaar | |
| 8,366,181 B2 | 2/2013 | Belpaire et al. | |
| 8,388,037 B2 | 3/2013 | LaNore et al. | |
| 8,671,573 B2 | 3/2014 | Larsen et al. | |
| 8,931,173 B2 | 1/2015 | Larsen et al. | |
| 9,592,858 B2 | 3/2017 | Kraushaar | |
| 2002/0024233 A1 | 2/2002 | Kleino | |
| 2010/0015427 A1 | 1/2010 | Belpaire et al. | |
| 2010/0092733 A1 | 4/2010 | Blank et al. | |
| 2010/0253004 A1 | 10/2010 | Lehmann et al. | |
| 2011/0049323 A1 | 3/2011 | Belpaire et al. | |
| 2011/0189428 A1 | 8/2011 | Belpaire et al. | |
| 2011/0206890 A1 | 8/2011 | Belpaire et al. | |
| 2011/0236610 A1 | 9/2011 | Belpaire | |
| 2011/0236616 A1 | 9/2011 | Belpaire | |
| 2012/0141724 A1 | 6/2012 | Belpaire et al. | |
| 2012/0207986 A1 | 8/2012 | Belpaire et al. | |
| 2013/0181470 A1 | 7/2013 | LaNore et al. | |

FOREIGN PATENT DOCUMENTS

| | | | |
|---|---|---|---|
| EP | 1048799 A1 | 11/2000 | |
| EP | 1122153 A3 | 10/2003 | |
| EP | 1373053 B1 | 1/2004 | |
| EP | 1932648 A1 | 6/2008 | |
| EP | 2019027 A1 | 1/2009 | |
| EP | 2117909 A1 | 11/2009 | |
| EP | 2121270 A1 | 11/2009 | |
| EP | 2147848 A1 | 1/2010 | |
| EP | 2154051 A1 | 2/2010 | |
| EP | 2154052 A1 | 2/2010 | |
| EP | 2159109 A1 | 3/2010 | |
| EP | 2159136 A1 | 3/2010 | |
| EP | 2165919 A1 | 3/2010 | |
| EP | 2238012 A1 | 10/2010 | |
| EP | 2323891 A1 | 5/2011 | |
| EP | 2331368 A2 | 6/2011 | |
| EP | 2334540 A1 | 6/2011 | |
| EP | 2463180 A1 | 6/2012 | |
| EP | 2234803 B1 | 10/2012 | |
| EP | 2289769 B1 | 11/2012 | |
| EP | 2289771 B1 | 1/2013 | |
| EP | 2553036 A1 | 2/2013 | |
| EP | 2337728 B1 | 4/2013 | |
| EP | 2401191 B1 | 4/2013 | |
| EP | 2183150 B1 | 11/2016 | |
| FR | 2858040 A1 | 1/2005 | |
| GB | 1332363 A | 10/1973 | |
| GB | 2065211 B * | 6/1983 | ............ E06C 7/086 |
| WO | 1998/36944 A1 | 8/1998 | |
| WO | 2002/074608 A1 | 9/2002 | |
| WO | 2009/016106 A1 | 2/2009 | |
| WO | 2009/080814 A1 | 7/2009 | |
| WO | 2010/018190 A1 | 2/2010 | |
| WO | 2011/163357 A2 | 12/2011 | |
| WO | WO-2011163357 A2 * | 12/2011 | ............ B29C 70/08 |
| WO | 2016/145494 A1 | 9/2016 | |

OTHER PUBLICATIONS

International Search Report & Written Opinion dated Oct. 12, 2015; Application No. PCT/US2015/028580.
International Preliminary Report on Patentability dated Nov. 10, 2016 (Application No. PCT/US2015/028580).
Opposition to EP2352665; Notice of Opposition by Sika dated Jan. 8, 2014.
Translation Opposition by Sika, Application No. 09752627.1 dated Oct. 7, 2014.
Application No. 08162226.8 filed Aug. 12, 2008, (priority document of PCT Patent Application, Application No. PCT/EP2009/060431 filed Aug. 12, 2009; published as WO2010/018190) (D15a in Sika Opposition Proceedings).
European Communication dated Oct. 13, 2017; Application No. 15722846.1.
Chinese Office Action, CN Application No. 201580033238.7 dated Nov. 7, 2018.

* cited by examiner

EXTRUDED REINFORCEMENTS

TECHNICAL FIELD

The present invention pertains generally to extruded structural reinforcements for reinforcing a cavity and more particularly to the reinforcement of cavities using only extruded polymeric parts without the use of molded (e.g., injection molded) structures.

BACKGROUND

Molded parts, often molded polymeric parts, are commonly used for structural reinforcement purposes. Molded parts are often preferred for their lightweight nature and substantial strength. However, the cost for the tooling and molds adds significant cost to any part produced. Further, any significant change to the profile of a part requires new tooling for additional cost.

Extrusions processes do not require the tooling and molds associated with molding. In addition, extruded parts can be easily modified and customized to fit the shape of a particular cavity. There is thus a desire to provide the strength of molded parts using parts formed by extrusion processes.

SUMMARY OF THE INVENTION

The teachings herein contemplate a method for making an insert, comprising the steps of extruding a thermoplastic material to form a first column structure having a first profile, extruding a thermoplastic material to form a second column having a second profile that is different from the first profile, and connecting the first column structure to the second column structure with a connector device so that the connector device is shaped to receive the first profile of the first column structure and the second profile of the second column structure. The one or more column structures may include one or more openings formed in a wall of the one or more column structures. An activatable material may be located onto at least a portion of one or more of the column structures. The activatable material may be located on at least one internal wall of the one or more column structures. The activatable material may be heat activated. The activatable material is activated by heat entering within the one or more column structures through the one or more openings formed in one or more walls of the one or more column structures. The thermoplastic material may be selected from the group consisting of a homopolymer, a copolymer, a terpolymer or a blend of two or more polymers. The insert may comprise a polyamide. The insert may have a specific gravity per ASTM D792 of from about 1 to about 1.3, from about 1.05 to about 1.2 (e.g., about 1.13). The insert may comprise a filler material. The filler may include glass. One or more of the plurality of fibers may extend at least 50%, at least 60%, at least 75%, at least 80% or at least 90% of the length of the insert.

The method may include extruding a plurality of fibers within or onto the insert. One or more of the plurality of fibers may be less than about 50 mm in length. One or more of the plurality of fibers are at least about 1 mm, at least about 5 mm, at least about 10 mm, or at least about 20 mm in length. One or more of the plurality of fibers extends along substantially the entirety of the insert. One or more of the plurality of fibers may include a coating. One or more of the plurality of fibers may include a coating comprising a polymer, a polymer precursor, or a combination thereof. The insert may comprise a polymeric material having a melting point of at least about 185° C. The insert may comprise a polymeric material having a melting point of less than about 260° C. The thermoplastic material may infiltrate one or more of the plurality of fibers. The thermoplastic material may form a tenacious bond with an exterior portion of one or more of the plurality of fibers. The plurality of fibers may comprise at least about 15%, at least about 20% or at least about 30%, or at least about 40% of the insert. The plurality of fibers may comprise less than about 70%, less than about 50%, or less than about 40% of the insert. The insert may have a wall thickness that varies along a length of the insert. The insert may have a wall thickness that varies by at least 10% along a length of the insert. The insert may have a wall thickness that varies by at least 25% along a length of the insert. The insert has a wall thickness that varies by at least 50% along a length of the insert.

The present teachings further envision a method for making an insert comprising extruding a thermoplastic material to form a first column structure having a first profile; extruding a thermoplastic material to form a second column having a second profile that is different from the first profile; forming one or more openings in one or more walls in one or more of the first and second column structures; locating an activatable material along one or more internal walls of one or more of the first and second column structures; connecting the first column structure to the second column structure with a connector device so that the connector device is shaped to receive the first profile of the first column structure and the second profile of the second column structure: and heat activating the activatable material so that heat reaches the activatable material within the one or more column structures via the one or openings formed in the one or more column structure walls.

The method may include locating the insert into a cavity for structurally reinforcing the cavity. The cavity may be located within an automotive vehicle. The insert may be located into a rocker of an automotive vehicle. The method may be free of any injection molding step.

The present teachings are also directed to a method for making an insert, comprising the steps of extruding a thermoplastic material to form a first column structure having a first rigid profile, forming one or more openings in the extruded material, wherein the forming step is substantially free of removing any material to form the openings and curving the profile whereby the openings facilitate the curving.

The one or more openings may be formed by die cutting after extrusion. The insert may include long fibers comprising glass, Kevlar, carbon, metals, polymeric materials, or combinations thereof. The insert may include fibers having a length of at least about 5 mm. The insert may include fibers having a length of at least about 10 mm. The insert may include fibers having a length of at least about 20 mm. The insert may include fibers that extend along the entirety of the insert. The insert may include fibers that extend along only select portions of the insert. The insert may include fibers that form ribbons, strings, yarns, toes, weaves, or combinations thereof. The insert may include fibers that are extruded in a continuous manner to be formed within the insert. The insert may include fibers that form ribbons, strings, yarns, toes, weaves, or combinations thereof which are extruded in a continuous manner to be formed within the insert. The ribbons, strings, yarns, toes, weaves, or combinations thereof may be formed of Kevlar, glass, carbon or combinations thereof. The insert may include fibers formed along the exterior of the insert. The insert may include fibers formed along the interior of the insert. The insert may include glass fiber arrangements extruded along the entirety of the insert or along only portions of the insert. The insert may include carbon fiber arrangements extruded along the entirety of the insert or along only portions of the insert. The insert may include Kevlar fiber arrangements extruded along the entirety of the insert or along only portions of the insert.

The teachings herein further provide for an insert comprising: a thermoplastic extruded or pultruded member, and a plurality of fibers extruded or pultruded with and/or onto the extruded member, wherein the fibers are at least about 5 mm in length. The thermoplastic may be selected from the group consisting of a homopolymer, a copolymer, a terpolymer or a blend of two or more polymers. The insert may comprise a polyamide. The insert may have a specific gravity per ASTM D792 of from about 1 to about 1.3, from about 1.05 to about 1.2 (e.g., about 1.13). The insert may comprise a filler material. The filler may include glass. One or more of the plurality of fibers may extend at least 50%, at least 60%, at least 75%, at least 80% or at least 90% of the length of the insert. The fibers may be at less than about 50 mm in length. One or more of the plurality of fibers may extend along substantially the entirety of the insert. One or more of the plurality of fibers may include a coating. One or more of the plurality of fibers may include a coating comprising a polymer, a polymer precursor, or a combination thereof. The insert may comprise a polymeric material having a melting point of at least about 185° C. The insert may comprise a polymeric material having a melting point of less than about 260° C. A thermoplastic material of the thermoplastic member may infiltrate one or more of the plurality of fibers. A thermoplastic material of the thermoplastic member may form a tenacious bond with an exterior portion of one or more of the plurality of fibers. The plurality of fibers may comprise at least about 15%, at least about 20% or at least about 30%, or at least about 40% of the insert. The plurality of fibers may comprise less than about 70%, less than about 50%, or less than about 40% of the insert. The insert may have a wall thickness that varies along a length of the insert. The insert may have a wall thickness that varies by at least 10% along a length of the insert. The insert may have a wall thickness that varies by at least 25% along a length of the insert. The insert may have a wall thickness that varies by at least 50% along a length of the insert.

The teachings herein also provide for an insert for insertion in a cavity comprising: a first extruded thermoplastic carrier formed in a plurality of adjacent hollow columns, one or more of the adjacent hollow columns including one or more openings formed in a wall of the hollow column; a second extruded thermoplastic carrier formed in a plurality of adjacent hollow columns, one or more of the adjacent hollow columns including one or more openings formed in a wall of the hollow column; an activatable material located within one or more of the adjacent hollow columns; and a connector device for contacting a portion of the first polyamide carrier and a portion of the second polyamide carrier. The insert may be located in a cavity for reinforcing the cavity. The insert may be located in the cavity of an automotive vehicle. The insert may be located into a rocker of an automotive vehicle. The insert may be free of any injection molded parts.

The teachings herein also envision a method comprising passing a polymeric material in a substantially flowable state through a die and substantially simultaneously passing a fiber through the die, wherein during the passing step the polymeric material has a relative viscosity of less than about 60 according to ASTM D789. During the passing step the polymeric material may have a relative viscosity of greater than about 40 according to ASTM D789. During the passing step the polymeric material may have a relative viscosity of less than about 70 according to ASTM D789.

The teachings herein provide for methods and devices that allow for the use of extruded reinforcement members. The reinforcement members may comprise a thermoplastic material which may be a polyamide material. The reinforcement members may comprise a plurality of fibers, which may be fibers greater than 5 mm in length. The polyamide may be a glass filled polyamide. The reinforcement members may be adapted to connect to secondary reinforcing sections to form lengthy reinforcement members that span at least 30%, at least 50%, or more of a vehicle body length. The reinforcement members may include openings so that any activatable material located within the member can be accessed and activated.

DETAILED DESCRIPTION

The present application claims the benefit of the priority of U.S. Provisional Application Ser. No. 61/986,402, filed Apr. 30, 2014; U.S. Provisional Application Ser. No. 62/061,816, filed Oct. 9, 2014 and U.S. Provisional No. 62/074,237, filed Nov. 3, 2014, the contents of these applications being hereby incorporated by reference for all purposes.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein are directed toward extruded and/or pultruded reinforcement members for reinforcing cavities. The reinforcement members may be extruded in column profiles (e.g., tube-like profiles having empty space within the column) to fill cavities having a length that is longer than any width of the cavity. The reinforcement members may be extruded in the shape of multiple adjacent columns. The reinforcement members may be formed of a material comprising polyamide, and possibly a glass filled polyamide. The reinforcement members may include an activatable material located therein and/or thereon. In order to effectively activate any activatable material located within the reinforcement members, the reinforcement members may be formed with one or more openings in a wall of the column structure so that any stimulus needed to activate the activatable material can access the activatable material.

Typically, reinforcement members are either formed of metallic materials or formed of injection molded polymeric materials. The use of polymeric materials for reinforcement provides for lower weight reinforcing structures and also provides the ability to form members in a desired shape to fit the profile of a cavity requiring reinforcement. However, the injection molding process requires that a mold be created (at high cost) for each profile shape needed. Thus, any change to the shape of a cavity requires a new mold. Further, the nature of these polymeric reinforcement members are such that the formation of members with substantial length requires increasingly costly molds, a substantial increase in material cost and a resulting increase in the overall weight of the reinforcement member. As such, polymeric reinforcements have frequently been avoided for such lengthy cavities.

Accordingly, the ability to extrude and/or pultrude such polymeric reinforcements provides for a number of benefits. First, the use of extrusion/pultrusion techniques avoids the need for expensive molds and allows for simplified modification to the shape of the reinforcing member. Second, the extruded reinforcement members can be extruded to form lengthy members having thinner walls with thinner profiles than their injection molded counterparts. The resulting parts are thus substantially lighter than a metallic reinforcement or an injection molded polymeric reinforcement.

In order to facilitate extrusion/pultrusion of the members disclosed herein, the material for forming the members must have a melt strength that is sufficient for it to hold shape during the extrusion/pultrusion process. Melt strength is the resistance of the polymeric material to stretching. The melt strength is related to the molecular chain entanglements of the polymer and its resistance to untangling under strain. The polymer properties affecting this resistance include molecular weight, molecular-weight distribution (MWD) and molecular branching. As each of these increases, melt strength is improved at low shear rates. For hollow profiles, the melt strength of the material will impact drawdown and sag. In co-extrusion applications, a relative balance of melt strength will improve stability at the interface between the co-extruded materials. Branched and crosslinked polymers require greater strain to untangle the molecules and permit them to flow, and thus provide more ideal melt strength.

Modifying the content of the polymeric material may improve melt strength to allow for extrusion/pultrusion. For example, by increasing the amount of glass within a polyamide material, the material may have improved melt strength and be able to hold its shape under strain. In addition, the co-extrusion of an epoxy-based material onto the polymeric material occurs at a much lower temperature so that the polymeric material is not so hot that it cannot withstand the pressure during the co-extrusion. Thus, the composition of both the polymeric member materials and the activatable material must be selected to perform under very different temperatures and pressures than those experienced in an injection molding process. Thus, the temperature at which the activatable material is extruded onto the polymeric member must be significantly lower than the temperature experienced in the overmolding process typically utilized for locating the activatable material onto the polymeric carrier.

The present teachings provide for extruded/pultruded polymeric reinforcement members that are formed to include one or more hollow profile structures. The hollow structures may be column shaped structures. The hollow structures may include an activatable material located within and/or onto the hollow structure. The hollow structures may further include one or more openings to allow for access to any activatable material located therein. More specifically, the activatable material may be activated by a certain stimulus (e.g., heat, UV radiation, or another such stimulus) and the openings may facilitate the stimulus effectively contacting the activatable material as necessary for activation. As a specific example, without the openings, the stimulus would initially reach activatable material located at an exposed end of the reinforcement member. In the event that the activatable material were to expand upon contact with the stimulus, as is often the case, the remainder of the activatable material located within the column would be blocked from exposure to the stimulus by the already expanded activatable material (e.g., the activated material) and would thus remain in an unexpanded state. The presence of the holes allows the stimulus to reach the activatable material throughout the hollow structure, even after activation of the activatable material at one or more ends of the hollow structure.

The activatable material may be adhered to the polymeric member via a chemical reaction during the extrusion/pultrusion process. The activatable material may be adhered via an adhesive or a mechanical fastener. Alternatively, the activatable material may be located into a keyed portion of the polymeric member to create mechanical interlock between the activatable material and the polymeric member.

The polymeric profiles may include fibers coextruded with the polymeric material and such fibers may preferably be lengthy (e.g., they may extend along at least $\frac{1}{4}^{th}$, at least $\frac{1}{2}$ or even at least the entirety of a length of the profile). The polymeric profiles may be formed from polymers including glass fibers. This material may be pelletized for use in extrusion, thus reducing the length of the glass fibers to less than 1 mm, less than 2 mm, less than 3 mm or even less than 5 mm. The fibers may comprise strengthening materials which may include but are not limited to glass, Kevlar, carbon, thermoplastic fibers or combinations thereof. The material may include fibers having a length of at least about 5 mm. The material may include fibers having a length of at least about 10 mm. The material may include fibers having a length of at least about 20 mm. Such fibers may be formed into specific fiber arrangements such as ribbons, toes, strings, yarns, weaves or any combination of these to provide strengthening to the insert. These fibers may extend along the entirety of the length of the insert or may alternatively be located only locally at certain portions of the insert. Furthermore, the fiber arrangements may be located along external portions of the inserts, along internal portions of the insert or along both external and internal portions of the insert. The use of extrusion mechanisms for forming the inserts allows for the fiber arrangements to be easily selectively located at certain portions of the inserts. For example, the fibers can be provided to the extruder at portions of the insert requiring localized reinforcement. Alternatively, the fiber arrangements can be continuously extruded along the entirety of the insert. As an example, the fibers may be Keylar fibers formed into ribbons and the fibers may extend along only certain exterior portions of the insert. As yet another example, the fibers may be glass fibers formed into strings and the fibers may extend along the entirety of the insert. The extrusion/pultrusion process itself may result in breaking of the fibers. As a result, the length of the fibers may be chosen to avoid breaking. The fibers may be formed into desired arrangements so that breaking is reduced. The fibers may also be located at specific locations along the insert so as to avoid breaking.

The reinforcement members may be extruded/pultruded to have any profile desired to correspond to the shape of a cavity requiring reinforcement. While reinforcement members are addressed herein, it is possible that such extrusion/pultrusion processes as discussed herein may be used to form inserts for sealing and/or baffling, such as those disclosed in U.S. Pat. Nos. 7,249,415; 7,784,186; 7,941,925; 8,671,573; and 8,931,173 and U.S. Provisional Application No. 62/154,778, all of which are incorporated by reference herein for all purposes. The extruded/pultruded profile may include one or more sections (which may be hollow sections, solid sections, or some combination thereof) of varying shape to form the desired profile. One or more reinforcement members having either the same profile or differing profiles may be connected to one another via a connector device to form lengthy extended members. Such connector device may be formed such that it includes portions that are received within (or alternatively that receive) sections of the columns. Each connector device may include one or more shaped portions that correspond to the shape of one or more sections of one or more columns. Accordingly, in order to secure a first column to a second column, one or more sections of each column may receive a correspondingly shaped portion of the connector device. The connector devices may employ one or more fastening means for securing a portion of the connector device to a column. More specifically, the connector device may include one or more extending portions that remain outside of the columns after connecting the connector device to one or more columns. These extending portions may be fastened to the columns via a mechanical fastener that is separate from or integrally formed with either the connector device or the column. Alternatively, an adhesive may be utilized for fastening the extending portions to the columns.

Additional fastening means may be utilized to locate the reinforcements within a desired vehicle cavity. Such fastening means may include a mechanical adhesive that is separate from or integrally formed with a portion of the reinforcements. The fastening means may include an adhesive. In one embodiment, the fastening means may include a bracket which may be used in combination with one or more screws or other mechanical fasteners. Such brackets may also be utilized to connect the connector device to a cavity wall.

The profiles may be formed to facilitate curving of the profiles either before or upon locating the profile into a cavity. Due to the relative rigidity of the extruded/pultruded material, it may be necessary to form openings along the profile so that the profile can be curved. The openings may be formed by removing material from the profile or alternatively the forming of the openings may be free of any material removal. The openings may be formed as slits along the profile. The openings may be formed at regular intervals along the profile or the openings may be formed at varying intervals along the profile. The openings may be formed along an entire profile or may be formed along only a portion of the profile. The openings may be formed only at locations along the profile that require curving. The frequency and size of the openings may depend upon the degree of curvature required. As a non-limiting example, a profile requiring a fairly significant degree of curvature may have longer or larger openings formed and/or a higher frequency of openings in the portion requiring curving. The profile may require curvature in more than one location and thus the profile may have openings located in multiple different locations along the profile at multiple differing frequencies.

As mentioned herein, an activatable material may be located on and/or within one or more portions of the reinforcements. The activatable material may be a polymeric material that is activated to flow, seal, expand or any combination thereof. It may be a material that forms a foam (e.g., an acoustic foam or a structural foam). It may expand from its original volume to at least 150%, 300%, 500%, or even 1000% or larger of its original volume. The activatable material may be activated when subjected to heat during paint shop baking operations. In applications where the activatable material is a heat activated, thermally expanding material, an important consideration involved with the selection and formulation of the material comprising the activatable material is the temperature at which a material reaction or expansion, and possibly curing, will take place. For instance, in most applications, it is undesirable for the material to be reactive at room temperature or otherwise at the ambient temperature in a production line environment. More typically, the activatable material becomes reactive at higher processing temperatures, such as those encountered in an automobile assembly plant, when the material is processed along with the automobile components at elevated temperatures or at higher applied energy levels, e.g., during paint or e-coat curing or baking steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. One or more sides of the activatable material may be tacky. One or more sides of the activatable material may be generally tack free to the touch at room temperature. Following activation of the activatable material, the material will typically cure. Thus, it may be possible that the activatable material may be heated, it may then expand, and may thereafter cure to form a resulting foamed material.

In the event that the profile is formed with openings for curving, the activatable material may be located such that upon expansion, the activatable material may preferably expand to cover the openings. In the event that the activatable material is extruded onto the profile, the openings may also be formed in the activatable material in which case the activatable material may preferably expand to fill the openings in both the profile material and the activatable material.

The manufacturing system may include one or more pultrusion steps, such as those described in U.S. Provisional Application No. 62/130,908 incorporated by reference herein for all purposes. By way of example, a possible manufacturing system may be employed for a pultrusion operation instead of or in addition to an extrusion operation in accordance with the present teachings. Raw material for forming a base polymeric material body may be fed into a receptacle associated with a pultruder. The pultruder may have a die through which the raw material is passed to form a shaped body profile (e.g., a pultruded profile). A mass of fibers may be pulled through the die and infiltrated while in the die with the raw material. The raw material (which may be a one-component or a plural-component mixture of reactive ingredients) may have a relatively low viscosity sufficient to allow the raw material to impregnate the mass of fibers and thereafter harden in a desired shaped profile that includes the mass of fibers. The shaped body profile may be cooled (e.g., by a vacuum cooler) to a desired temperature. A feed system may feed a fibrous material (e.g., by way of rollers) to the die at which the raw material for forming a polymeric matrix is contacted with the fibrous material (e.g., the mass of fibers). In an instance, where the pultruded material has thermoplastic characteristics (e.g., a thermoplastic epoxy) a forming miller (or another suitable extrusion type shaping device) may then further define the desired shape of the resulting fibrous composite material. The forming roller may also serve to help join the fibrous composite material with any optional shaped base body profile. Upon any joinder the resulting overall composite may be cooled (e.g., by a cooling tank). Optionally, if to be employed for use as a carrier for a baffling and/or structural reinforcement application, the resulting overall composite may be advanced by a conveyor device (e.g., a pulling or pushing device). An activatable material may be applied to the composite by an extruder (e.g., a cross head extruder). Thereafter, the resulting composite (with or without the activatable material on it) may be cut by a suitable cutting device (e.g., a traveling cut-off saw). By way of illustration, without limitation, the raw material may be a glass filled polyamide heated to about 260° C. Upon exiting the cooler, the temperature may be about 150 to about 175° C. The fibers may be glass fibers that are roll coated with a reaction product of a monoethanolamine and diglycidyl ether of bisphenol A, while the reaction product is in a softened state. Upon exiting the cooling tank the composite may be at a temperature of about 120° C. At the time of passing the extruder, the temperature may be about 90-95° C. The cross-head extruder may extrude one or more masses of a heat activatable epoxy-based structural foam, such as a structural reinforcement material in the L-55xx series, available from L&L Products, Inc.

The teachings herein can make any number of different parts. One example is a door intrusion beam that can be installed in an automotive vehicle for helping resist deformation that would intrude into a vehicle body in the event of a collision. The intrusion beam may be extruded. However, desirably it is pultruded and has a pultrudate with a profile that may be constant or varying along its length.

The teachings herein provide for an extruded/pultruded insert comprising an elongated tubular structure (e.g., a composite having a polymeric matrix) having a first end and a second end. At least one attachment device may be adapted for attaching the tubular structure to a vehicle frame or cavity. The elongated tubular structure may have a longitudinal axis and also has at least one reinforcement portion that includes a continuous fiber reinforcement embedded in a polymeric matrix and has a plurality of fibers aligned generally parallel with the longitudinal axis. A plurality of fibers (e.g., at least about 50%, 60%, 70% or more by weight of the total fiber content) may extend from the first end to the second end: by way of example the plurality of fibers may be generally aligned with the longitudinal axis. The plurality of fibers may be embedded in the polymeric matrix under a state of tension or compression.

The hollow profile may be open or closed along its length. The at least one attachment device may include an adhesive, a mechanical fastener, or both for attaching to the door frame. The elongated tubular structure may include one or more strips of an activatable polymeric material on an outer surface, the activatable material adapted for damping of vibration, for resisting flutter, or for bonding to an adjoining structure (see US Publication No. 20020024233 incorporated by reference herein for all purposes).

The continuous fibers may be preloaded in a reinforcement portion. The elongated tubular structure may have a constant profile along the longitudinal axis. From about 40% to about 80%, about 50% to about 70%, by weight of the beam is fibers. The fibers may be glass fibers. The polymer of the polymeric matrix may be an epoxy. For example, the polymeric matrix include a thermoplastic epoxy such as described generally herein (e.g., it may be a reaction product of a diepoxide resin (e.g., SPA), and one or more of a mono primary amine, a di-secondary amine, a dimer captan and/or a di-carboxylic acid. The polymer of the polymeric matrix may be a thermoplastic epoxy.

Accordingly, the teachings herein also envision a method of making a thermoplastic pultruded article, comprising the steps of pulling a plurality of continuous fibers through a die for defining a continuous profile that has at least two portions that are not coplanar and have differing thickness relative to each other; contacting the plurality of continuous fibers with one or more reactants for forming a continuously forming a polymer for a generally continuous polymeric matrix of the a resulting pultruded article, wherein the two or more reactants include a diepoxide resin (e.g., BPA), a mono primary amine, a di-secondary amine, a dimer captan and/or a di-carboxylic acid; and applying a sufficient amount of energy to cause a continuous primary reaction of the two or more reactants to continuously forma thermoplastic pultruded article having a thermoplastic polymeric matrix in contact with the continuous fibers and embedding the continuous fibers therein.

Though described in connection with a thermoplastic materials, the teachings herein are more general and may apply to pultruding other materials as well such as thermoset materials. Examples of other materials may include polyesters, polyurethanes, epoxies, or otherwise. The die may be about 0.2 to about 1 (e.g., 0.5) meters in length. The rate of the pultruding is at least about 0.5 (1, 2 or 3) meters per minute. The die may include an opening therein into which the reactants are introduced so that the step of contacting occurs within the die. The contacting may occur in advance of the die (e.g., in a bath or pool).

The method may also include a step converting the thermoplastic pultruded article to a thermoset pultruded article by employing a secondary reaction that occurs under an energy condition that is different from the energy condition for the primary reaction sufficient for causing cross-linking of at least a portion of the polymeric matrix.

The method may include a step of subjecting the resulting article to a secondary shaping operation, selected from thermoforming, blow molding, hydroforming, insert injection molding, compression molding, cutting, heat shaping, joining (e.g., by adhesion, compression fitting or the like). The secondary operation may be performed continuously.

The method may further comprise pulling the resulting thermoplastic pultruded article over a heated mandrel for imparting a curvature or other variable shape over at least a portion of the pultruded article. The resulting article may have an ultimate tensile strength (UTS) of at least 300 MPa to less than 1000 MPa. The resulting article may have a tensile modulus of at least 10 GPa to less than 50 GPa.

Figures 1, 2:
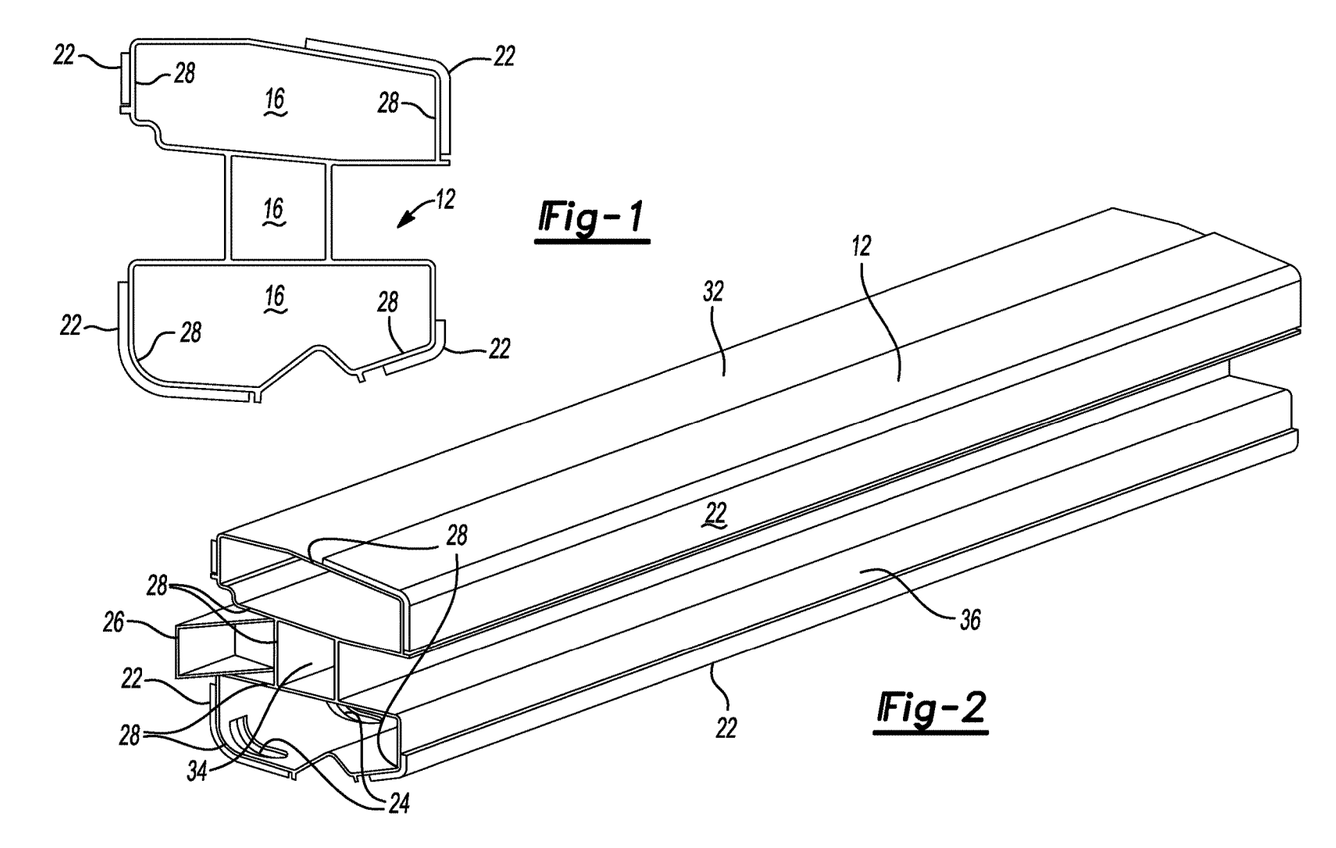
FIG. 1 illustrates a cross-sectional view of an exemplary reinforcement member in accordance with the present teachings.
FIG. 2 illustrates a perspective view of an exemplary reinforcement member in accordance with the present teachings.

With reference to FIG. 1, there is seen a cross sectional view showing a first profile 16 of a first column 12 of the insert. The first profile includes a layer of activatable material 22 along portions of certain exterior walls 28 of the first column. FIG. 2 depicts the first column 12 of FIG. 1 showing the activatable material 22 along portions of multiple exterior walls 28 of the first column. A bracket 26 is shown in association with multiple exterior walls 28 of the first column. A portion of the first column includes a plurality of openings 24. As depicted in FIG. 2, the first column may include a first section 32, a second section 34, and a third section 36.

Figure 3A:
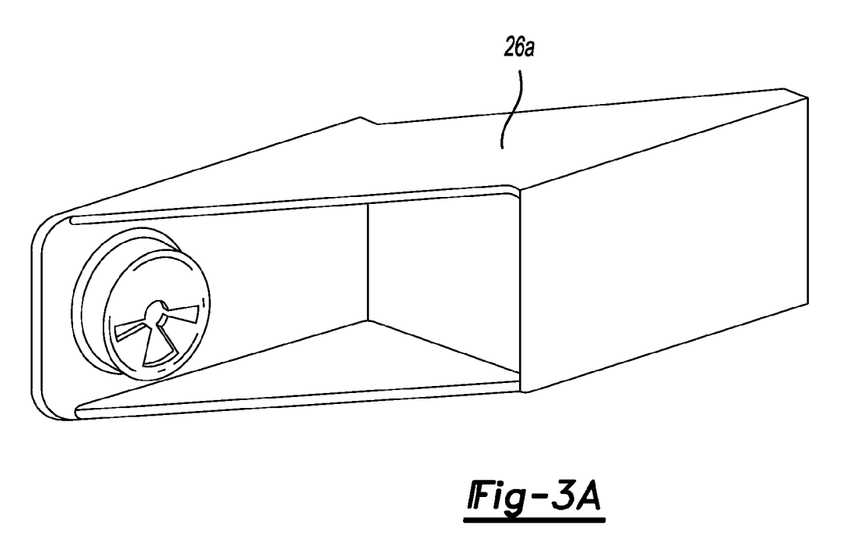
FIGS. 3A and 3B are perspective views of brackets in accordance with the present teachings.
Figure 3B:
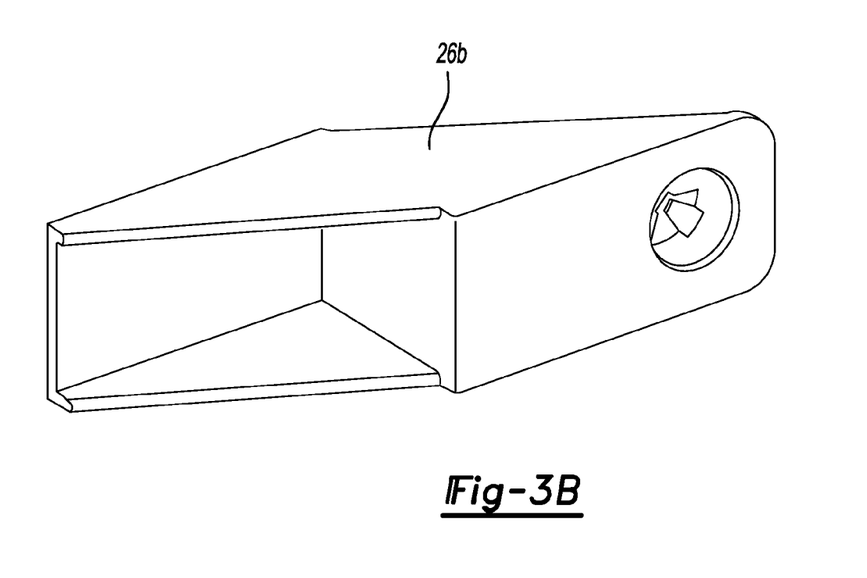
Figure 4:
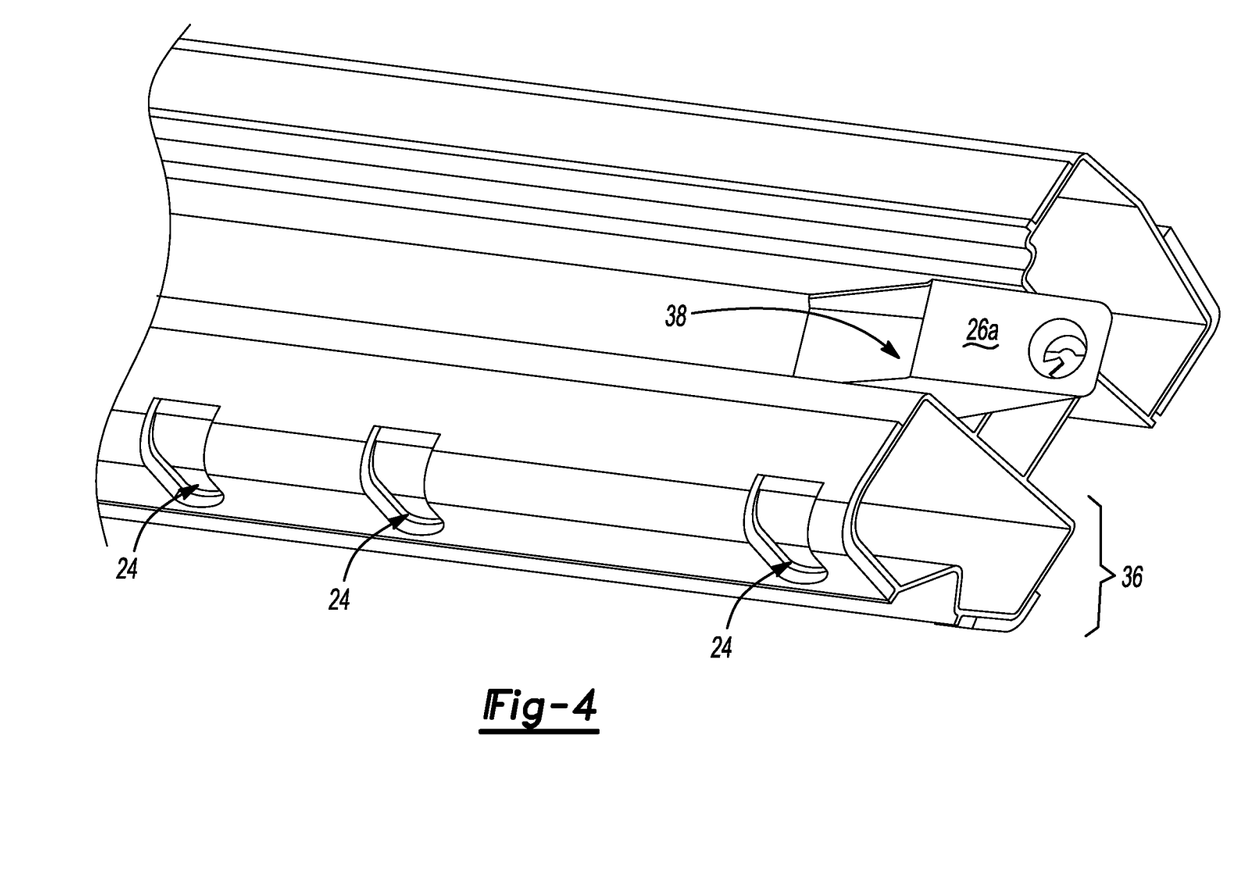
FIG. 4 is a perspective view of a reinforcement member and the bracket of FIG. 3B in accordance with the present teachings.

FIGS. 3A and 3B depict a first bracket 26a for connecting to a first column and a second bracket 26b for connecting to a second column. FIG. 4 shows the first bracket 26a contacting a first column 12. A pair of screws 38 may be used to attach the bracket 26a to the column 12. A plurality of openings 24 are included along the third section 36 of the first column 12.

Figures 5, 6:
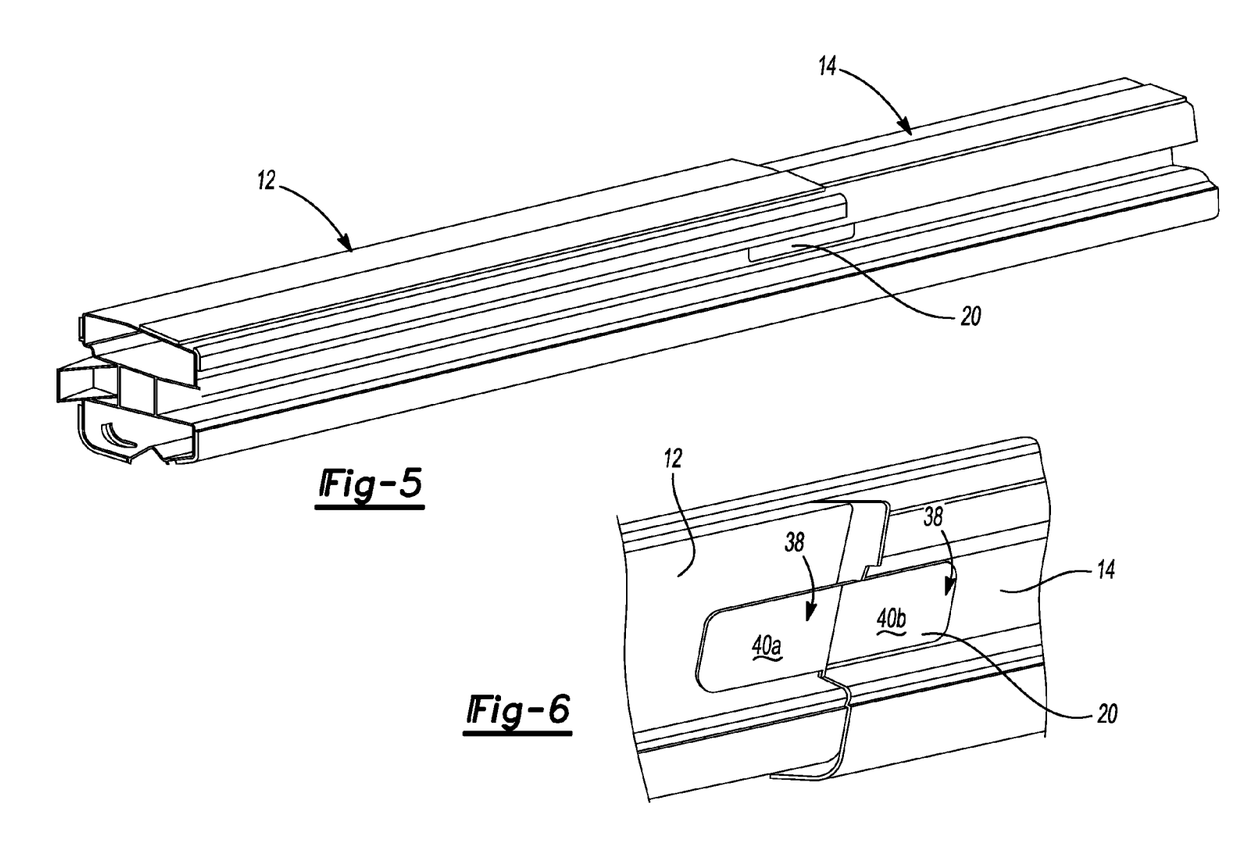
FIG. 5 is a perspective view of two connected reinforcement members and the brackets of FIGS. 3A and 3B in accordance with the present teachings.
FIG. 6 is a view of the brackets of FIGS. 3A and 3B shown connecting two reinforcement members in accordance with the present teachings.

FIG. 5 shows a first column 12 and a second column 14 connected by a connector device 20. FIG. 6 shows a close-up view of the connector device 20 when connected to both the first column 12 and second column 14. One or more screws 38 are used for connecting a first extending portion 40a of the connector device 20 to a second extending portion 40b of the connector device 20.

Figure 7:
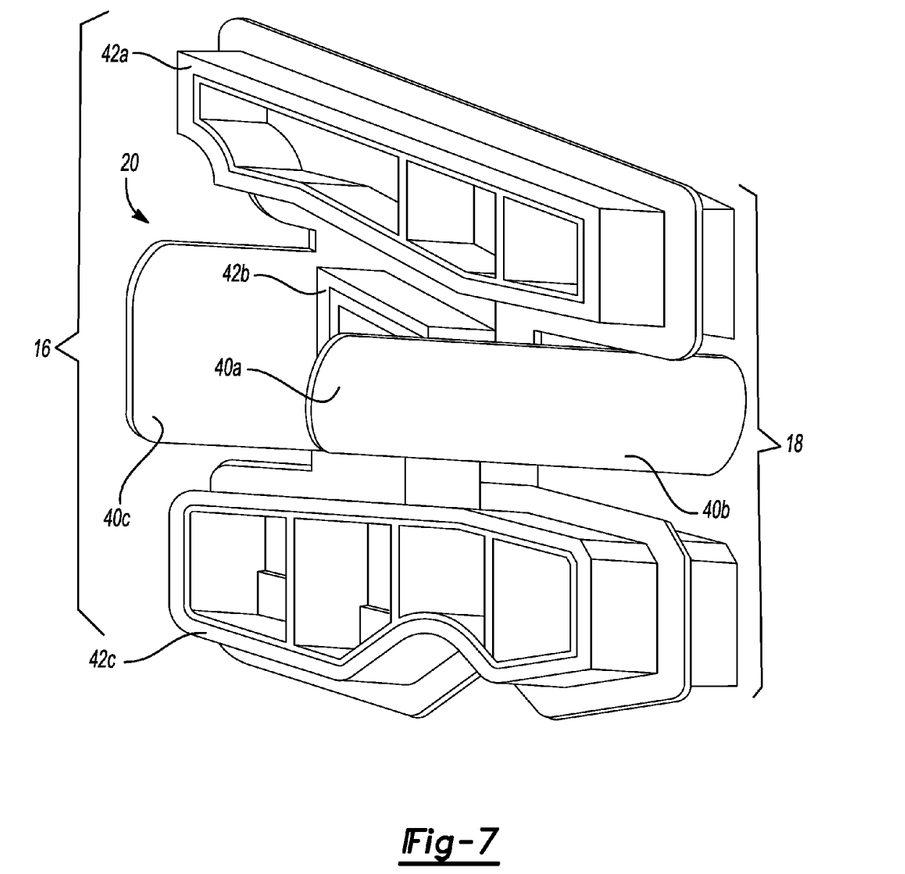
FIG. 7 is a perspective view of a connector device in accordance with the present teachings.

FIG. 7 shows the connector device 20 prior to any connection to the columns. The connector device 20 is formed for connecting multiple columns having a first profile 16 and a second profile 18. The connector device includes a first extending portion 40a, a second extending portion 40b, a third extending portion 40c and a fourth extending portion (not visible), The connector device also includes a first section 42a, a second section 42b and a third section 42c, all for being received within a cavity of the first column (not shown).

Figure 8:
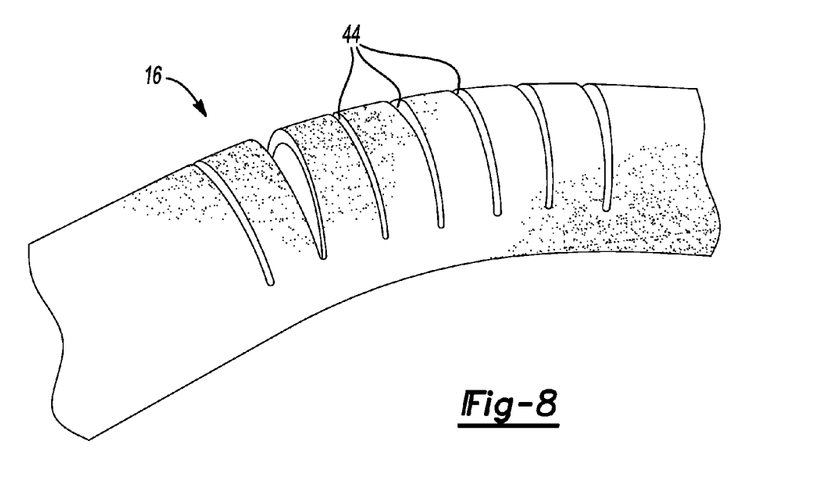
FIG. 8 is a perspective view of an exemplary curved reinforcement device in accordance with the present teachings.
Figure 9:
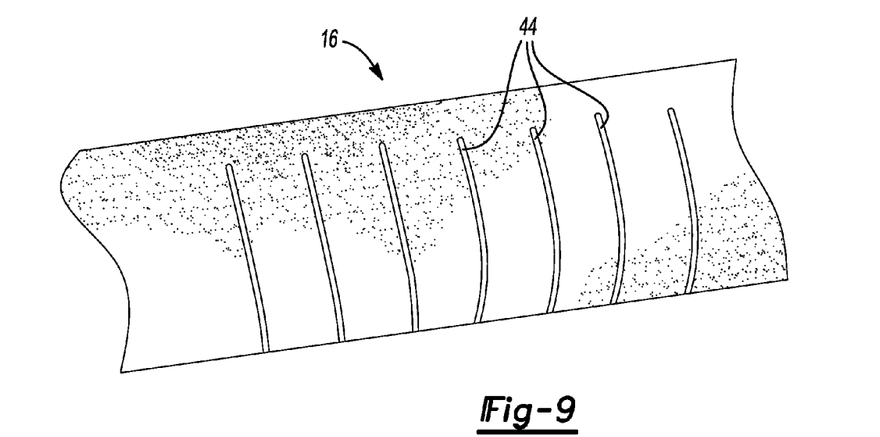
FIG. 9 is a perspective view of an exemplary reinforcement device prior to curving in accordance with the present teachings.
Figure 10:
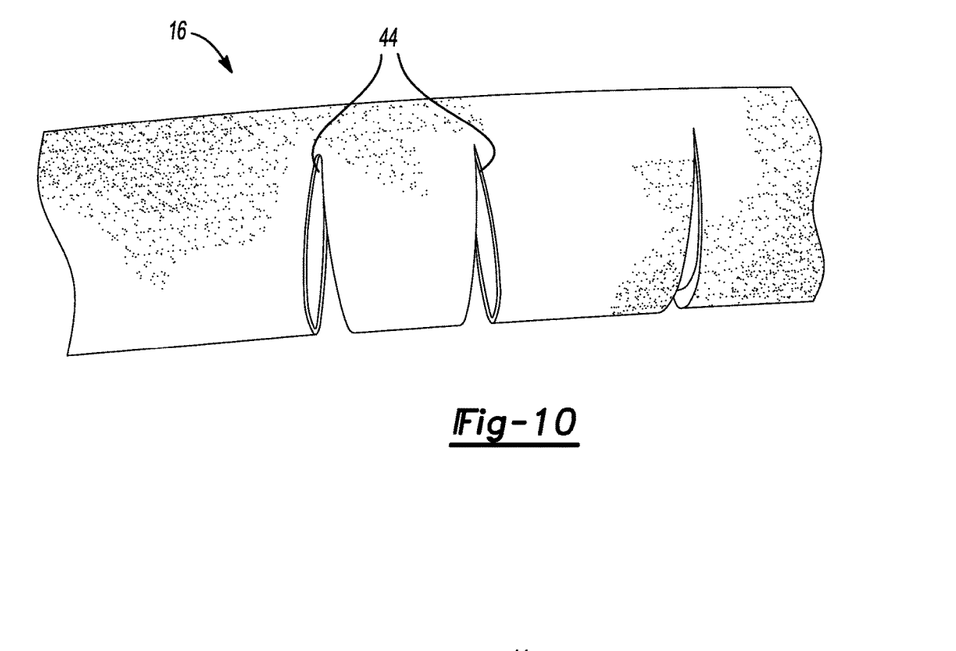
FIG. 10 is a perspective view of an exemplary reinforcement device in accordance with the present teachings.
Figure 11:
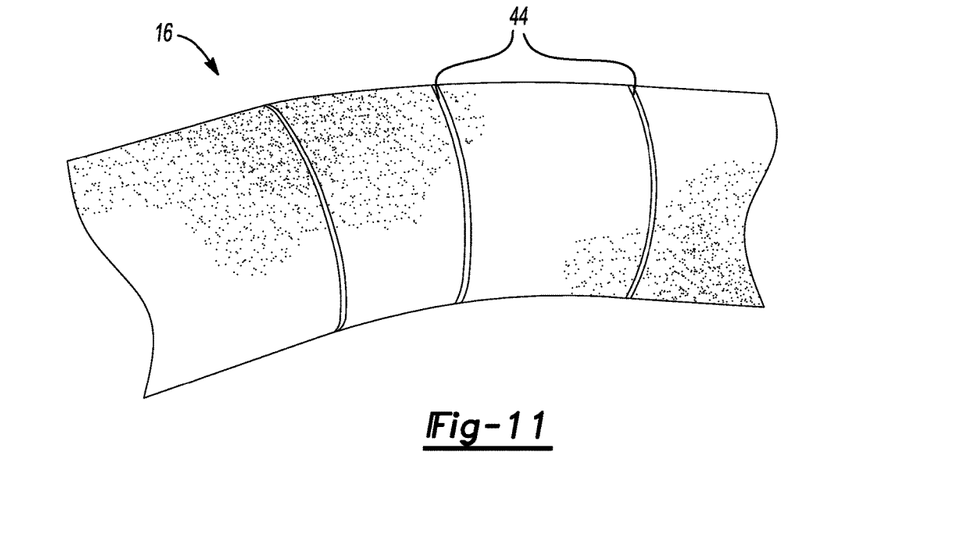
FIG. 11 is a perspective view of an exemplary reinforcement device in accordance with the present teachings.

FIGS. 8 and 9 show the first profile 16 including a plurality of equidistant openings 44 for facilitating curvature of the profile. FIGS. 10 and 11 show the first profile 16 including a plurality of openings 44 formed at variable locations. The location of the openings may thus be modified as needed depending on where curvature is required within a cavity and the degree of curvature needed. The profile 16 may also include activatable material (not shown). The activatable material may expand upon exposure to a stimulus such that the expanded material may cover the openings 44.

Figure 12A:
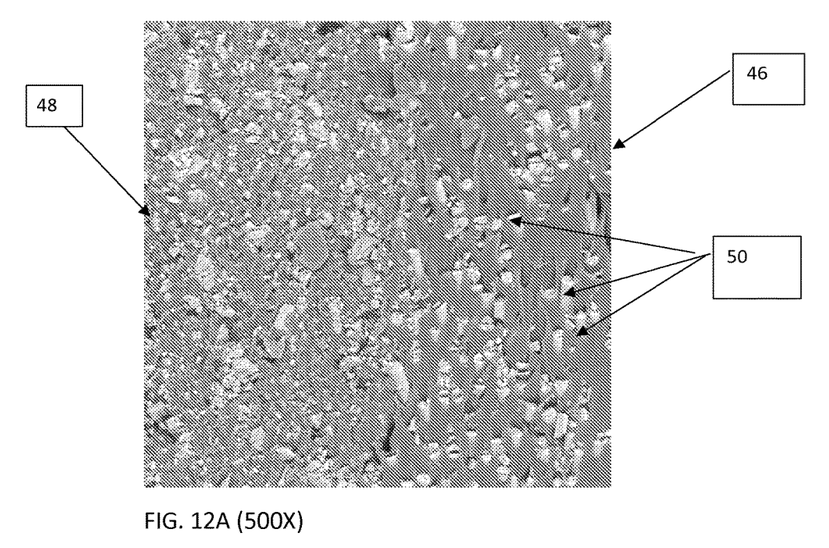
FIGS. 12A-12B shows microscopic views of extruded polymeric and activatable materials.
Figure 12B:
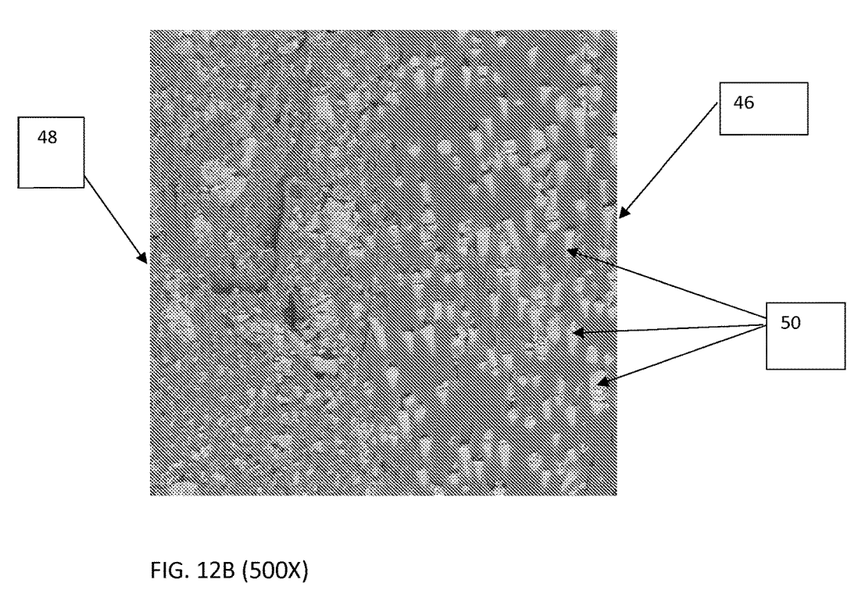

As shown in FIGS. 12A-12B, the microstructure of the profiles post-extrusion show a distinct arrangement of fibers 50 within the polymeric profile material 46 and also a distinct interface between the activatable material 48 and the polymeric profile material 46. Specifically, with regard to the fiber arrangement in the polymeric profile material (assuming profile wall thicknesses of 10° or less), at least about 80% of the fibers by number, or even at least about 90% of the fibers by number within the profile post extrusion are within about 15° (e.g., within about 5°, within about 10° or even within about 15°) of being substantially parallel to a final orientation axis of the profile. The final orientation axis is not parallel to the axis of extrusion of the profile, as would be expected, but rather is generally at an angle that is less than 45°, less than 30°, less than 20° or even less than 15° relative to the axis of extrusion. The final orientation axis is greater than 2°, greater than 5°, or even greater than 10° relative to the axis of extrusion. About 90% by number of fibers in the extrusion are not substantially parallel to the axis of extrusion as would be expected, but are instead off-axis relative to the axis of extrusion by at least 3°, at least 5° or more, but less than 40°, less than 20° or below.

As compared to injection molded polymeric profiles, extruded profiles including a fiber component (which may be a glass filled fiber component) are able to maintain a generally consistent spacing between and among the fibers. As an example, glass filled polyamide materials that are injection molded show distinct clumping of the glass and thus voids in the polyamide that include reduced amounts of glass fibers. Improves consistency of part. Furthermore, extruded polymeric profiles show an absence of voids caused by air traps that may be present in injection molded parts. Thus, the extruded profiles discussed herein may be substantially free subs free of any air void anomalies. More specifically, at least throughout 99% of the volume of the polymeric profile may be substantially free of any air void anomalies.

To determine the nature of the fibers within the extrusion, micrographs are created from photos taken by a scanning electron microscope. Six different sections of an extruded part are taken parallel to the axis of extrusion (e.g., the axis of the direction of travel of material as extruded through the die). The photos are magnified to a magnification of 500× for each section to produce the micrographs as shown for example at FIGS. 12A and 12B. Within each micrograph, each section is again divided into six equally sized and shaped sections. The axis of extrusion is identified to be consistent with the section taken from the part and the angular orientation of the fibers are measured relative to that axis and relative to the final orientation axis (e.g., which may be a median angle of the fibers post-extrusion). Based upon this testing it is expected that throughout a filled section, there will be at least about 80% by number, or even 90% by number of fibers that are oriented within about plus or minus 15° of the final orientation axis (e.g., plus or minus 15° of each other). Accordingly it is expected that there will be a generally uniform orientation of fibers across an entire longitudinal cross-section of a part.

With reference to the interface between the activatable material and the polymeric profile materials (the interface being defined as the location where the polymeric profile contacts the activatable material in an as-extruded state. The surface of the carrier will have a relatively roughened surface texture as compared for example with a surface of a conventional injection molded part that is designed to be free of grain. The interface of the extruded profiles will be jagged in shape, which may thus improve adhesion of the activatable material to the polymeric profile.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x'parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A method for making an insert, comprising the steps of:
  a. extruding a thermoplastic material to form a first column structure having a first profile;
  b. extruding a thermoplastic material to form a second column having a second profile that is different from the first profile;
  c. connecting the first column structure to the second column structure with a connector device so that the connector device is shaped to receive the first profile of the first column structure and the second profile of the second column structure;
  wherein an activatable material is located onto at least a portion of one or more of the column structures and is activated by heat entering within the one or more column structures through one or more openings formed in one or more walls of the one or more column structures.

2. The method of claim 1, wherein the one or more of the column structures include one or more openings formed in a wall of the one or more column structures.

3. The method of claim 1, wherein the activatable material is located on at least one internal wall of the one or more column structures.

4. The method of claim 1, wherein the thermoplastic material is selected from the group consisting of a homopolymer, a copolymer, a terpolymer or a blend of two or more polymers.

5. The method of claim 1, wherein the insert has a specific gravity per ASTM D792 of from about 1 to about 1.3.

6. The method of claim 1, wherein the insert comprises a glass filler material.

7. The method of claim 1 including a plurality of extruded fibers that extend between 50% and 90% of the length of the insert.

8. The method of claim 7, wherein one or more of the plurality of fibers are less than about 50 mm in length.

9. The method of claim 7, wherein one or more of the plurality of fibers are at least about 1 mm in length.

10. The method of claim 7, wherein one or more of the plurality of fibers extends along substantially the entirety of the insert.

11. The method of claim 7, wherein one or more of the plurality of fibers includes a coating.

12. The method of claim 7, wherein one or more of the plurality of fibers includes a coating comprising a polymer, a polymer precursor, or a combination thereof.

13. The method of claim 1 wherein the insert comprises a polymeric material having a melting point of at least about 185° C., and less than about 260° C.

14. The method of claim 1, wherein the thermoplastic material forms a tenacious bond with an exterior portion of one or more of the plurality of fibers.

15. The method of claim 1, wherein the plurality of fibers comprise at least about 15% of the insert.

16. The method of claim 7, wherein the insert has a wall thickness that varies along a length of the insert.

17. The method of claim 7 wherein the insert has a wall thickness that varies by at least 25% along a length of the insert.

18. A method for making an insert, comprising the steps of:
  a. extruding a thermoplastic material to form a first column structure having a first profile;
  b. extruding a thermoplastic material to form a second column having a second profile that is different from the first profile;

c. forming one or more openings in one or more walls in one or more of the first column structure and second column structure;
d. locating an activatable material along one or more internal walls of one or more of the first and second column structures;
e. connecting the first column structure to the second column structure with a connector device so that the connector device is shaped to receive the first profile of the first column structure and the second profile of the second column structure;
f. heat activating the activatable material so that heat reaches the activatable material within the one or more of the first column structure and the second column structure via the one or openings formed in the one or more walls in the first column structure and the second column structure.

19. The method of claim 18, wherein the insert has a specific gravity per ASTM D792 of from about 1 to about 1.3.

20. The method of claim 18, including extruding a plurality of fibers that extend at least 50% of the length of the insert.

* * * * *